United States Patent
Masuda

(10) Patent No.: US 8,681,358 B2
(45) Date of Patent: Mar. 25, 2014

(54) PROCESS COORDINATING SYSTEM, INFORMATION PROCESSING APPARATUS, AND A COMPUTER-READABLE RECORDING MEDIUM STORING AN INFORMATION PROCESSING PROGRAM

(75) Inventor: Masaya Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 341 days.

(21) Appl. No.: 13/067,455

(22) Filed: Jun. 2, 2011

(65) Prior Publication Data

US 2011/0304891 A1    Dec. 15, 2011

(30) Foreign Application Priority Data

Jun. 11, 2010  (JP) ................................. 2010-133568

(51) Int. Cl.
G06F 3/12      (2006.01)
G06K 15/00     (2006.01)
H04L 9/32      (2006.01)

(52) U.S. Cl.
USPC ............. 358/1.15; 358/1.13; 358/1.18; 726/5

(58) Field of Classification Search
USPC ............................ 358/1.15, 1.18, 1.13; 726/5
See application file for complete search history.

(56) References Cited

U.S. PATENT DOCUMENTS

| | | | |
|---|---|---|---|
| 2007/0011726 A1* | 1/2007 | Choi | 726/5 |
| 2007/0133882 A1 | 6/2007 | Matsuno | |
| 2007/0171473 A1* | 7/2007 | Iwasaki | 358/1.18 |
| 2010/0103456 A1 | 4/2010 | Masuda | |
| 2011/0023024 A1 | 1/2011 | Masuda | |

FOREIGN PATENT DOCUMENTS

JP    2007166595 A    6/2007

* cited by examiner

*Primary Examiner* — Charlotte M Baker
(74) *Attorney, Agent, or Firm* — Harness, Dickey & Pierce, P.L.C.

(57) ABSTRACT

A process coordinating system includes an image forming apparatus and an information processing apparatus that are connected via a network. The image forming apparatus includes an acquiring unit configured to acquire image data; an attaching unit configured to attach metadata including process contents to the image data acquired by the acquiring unit; and a transmit unit configured to transmit the acquired image data and the attached metadata. The information processing apparatus includes a receive unit configured to receive the image data and the metadata; a display control unit configured to cause an execution button for executing the process contents included in the received metadata and the received image data to be displayed in the same screen; and a processing unit configured to perform a process indicated by the process contents on the image data upon pressing of the execution button.

9 Claims, 13 Drawing Sheets

FIG.7

```xml
<?xml version="1.0" encoding="UTF-8"?>
<!DOCTYPE components PUBLIC
 "-//XXXXX//DTD S2Container 2.3//EN"
 "http://www.xxxxx.org/dtd/components23.dtd">
<document>
    <metadata>
701 ───▶ <displayName>sample</diplayName>
702 ───▶ <fileName>sample.doc</fileName>
703 ───▶ <editingFlow>
704 ───▶       <item order="1" id="AAA">stamp</item>
705 ───▶       <item order="2" number="000-000-0000">sendPCFax</item>
            </editingFlow>
    </metadata>
</components>
```

PROCESS COORDINATING SYSTEM, INFORMATION PROCESSING APPARATUS, AND A COMPUTER-READABLE RECORDING MEDIUM STORING AN INFORMATION PROCESSING PROGRAM

BACKGROUND OF THE INVENTION

1. Field of the Invention

The present invention relates to process coordinating systems, information processing apparatuses, and computer-readable recording media storing an information processing program.

2. Description of the Related Art

Distribution technologies are known by which image data that have been scanned or received via fax are distributed to a server or attached to a mail message for transmission. The distributed image data may be edited or viewed by using a system adapted to a data format of the image data.

For example, consider an order receiving/placing operation using fax. First, an image forming apparatus distributes an order receipt for a product received via fax to a file server in the form of electronic data. The file server receives the distributed electronic data, and then opens an electronic file by using image editing software, for example. Thereafter, the electronic file may be transmitted via fax after a seal selected by a user is affixed onto the electronic file.

Various technologies for improving the efficiency of operation of the above scan solution or fax solution have been proposed. The scan solution and the fax solution are examples of distribution solutions. For example, Japanese Laid-open Patent Publication No. 2007-166595 discusses a technology whereby document data with first metadata embedded is printed on a sheet of paper, a predetermined process is performed on the printed sheet, and then the paper document is scanned to obtain a scan image. Various information items may be acquired at the time of scanning as second metadata, and a predetermined process is then performed depending on the paper document.

The above related art assumes the existence of a paper document and involves the printing of the metadata-embedded document at least once. However, in view of the increasing attention focused on paperless operations in recent years, there is a demand for the improvement of efficiency of the distribution solution for a paperless operation.

In a distribution solution, distributed data may be edited in an information processing apparatus and then distributed to a distribution destination. FIG. 1 illustrates an example of a distribution system in which data distributed by the scan solution or the fax solution (MFP) is received by an information processing apparatus (PC). The information processing apparatus may edit the received data and then distribute the edited data to a document managing system of a distribution destination or transmit the data via fax by the fax solution.

In such a case, the distributing system and the system that processes the distributed data ("the distributed system") are often developed separately, resulting in a lack of coordination between the distributing system and the distributed system.

SUMMARY OF THE INVENTION

In one aspect, the invention provides a process coordinating system in which an image forming apparatus and an information processing apparatus are connected via a network. The image forming apparatus includes an acquiring unit configured to acquire image data; an attaching unit configured to attach metadata including process contents to the image data acquired by the acquiring unit; and a transmit unit configured to transmit the acquired image data and the attached metadata. The information processing apparatus includes a receive unit configured to receive the image data and the metadata; a display control unit configured to cause an execution button for executing the process contents included in the received metadata and the received image data to be displayed, in the same screen; and a processing unit configured to perform a process indicated by the process contents on the image data upon pressing of the execution button.

In another aspect, the invention provides an information processing apparatus including a receive unit configured to receive image data and metadata including process contents for the image data; a display control unit configured to cause an execution button for executing the process contents included in the received metadata and the received image data to be displayed in the same screen; and a processing unit configured to perform a process indicated by the process contents on the image data upon pressing of the execution button.

In another aspect, a computer-readable recording medium stores an information processing program configured to cause a computer to provide the functions of a receive unit configured to receive image data and metadata including process contents for the image data; a display control unit configured to cause an execution button for executing the process contents included in the received metadata and the received image data to be displayed in the same screen; and a processing unit configured to perform a process indicated by the process contents on the image data upon pressing of the execution button.

BRIEF DESCRIPTION OF THE DRAWINGS

FIG. 7 illustrates an example of metadata;

DETAILED DESCRIPTION OF THE PREFERRED EMBODIMENTS

Embodiments of the present invention are described with reference to the attached drawings. In the following description, a multifunction peripheral (MFP) is described as an example of an image data input/output apparatus including the multiple functions of a printer, a scanner, a copier, and a facsimile machine in one enclosure. However, this is merely an example; any apparatus capable of inputting and outputting image data, such as a scanner apparatus or a facsimile apparatus, may be utilized in an embodiment of the invention.

<System and Hardware>

Figure 1:
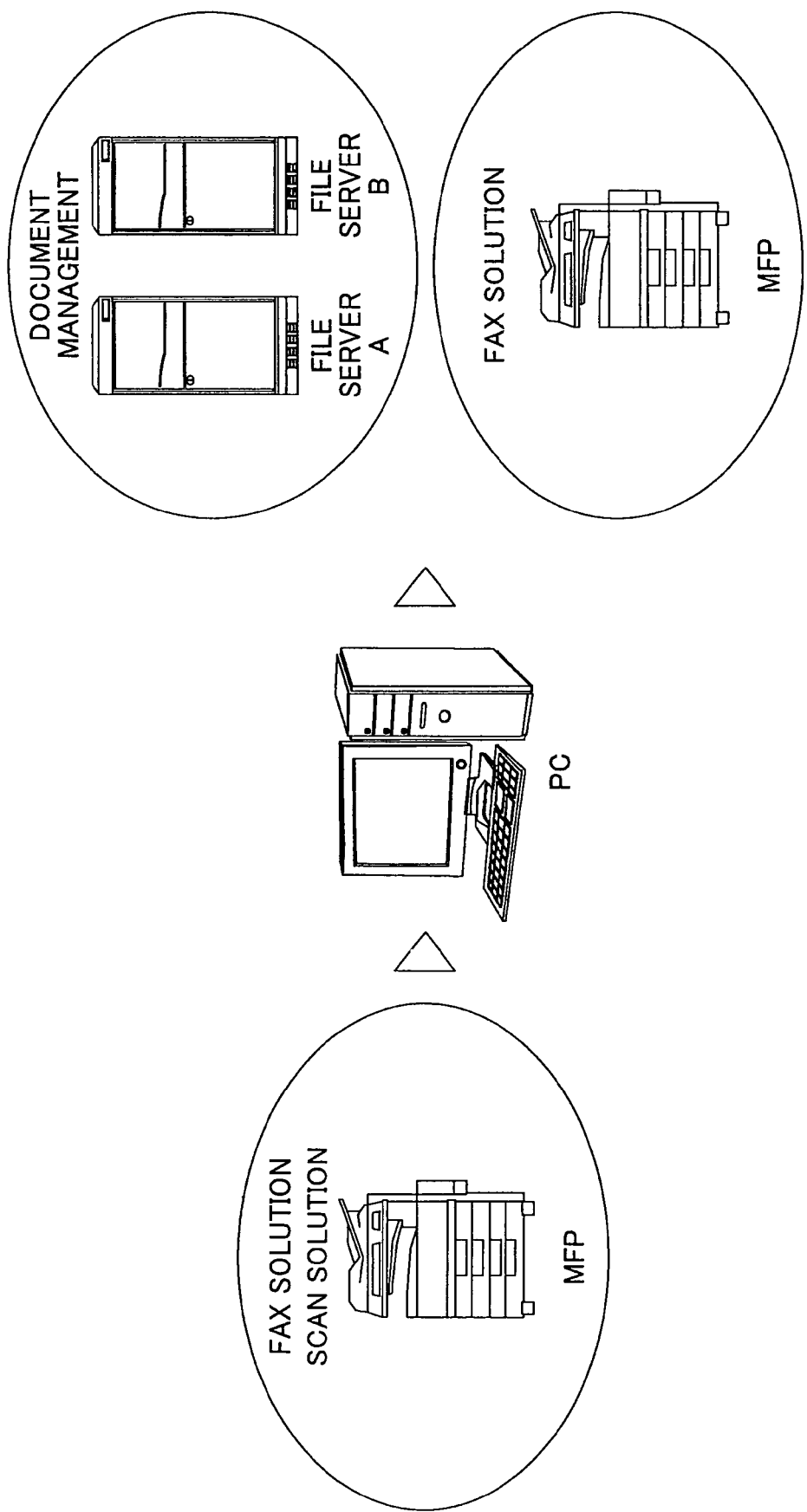
FIG. 1 illustrates a distribution system according to the related art.
Figure 2:
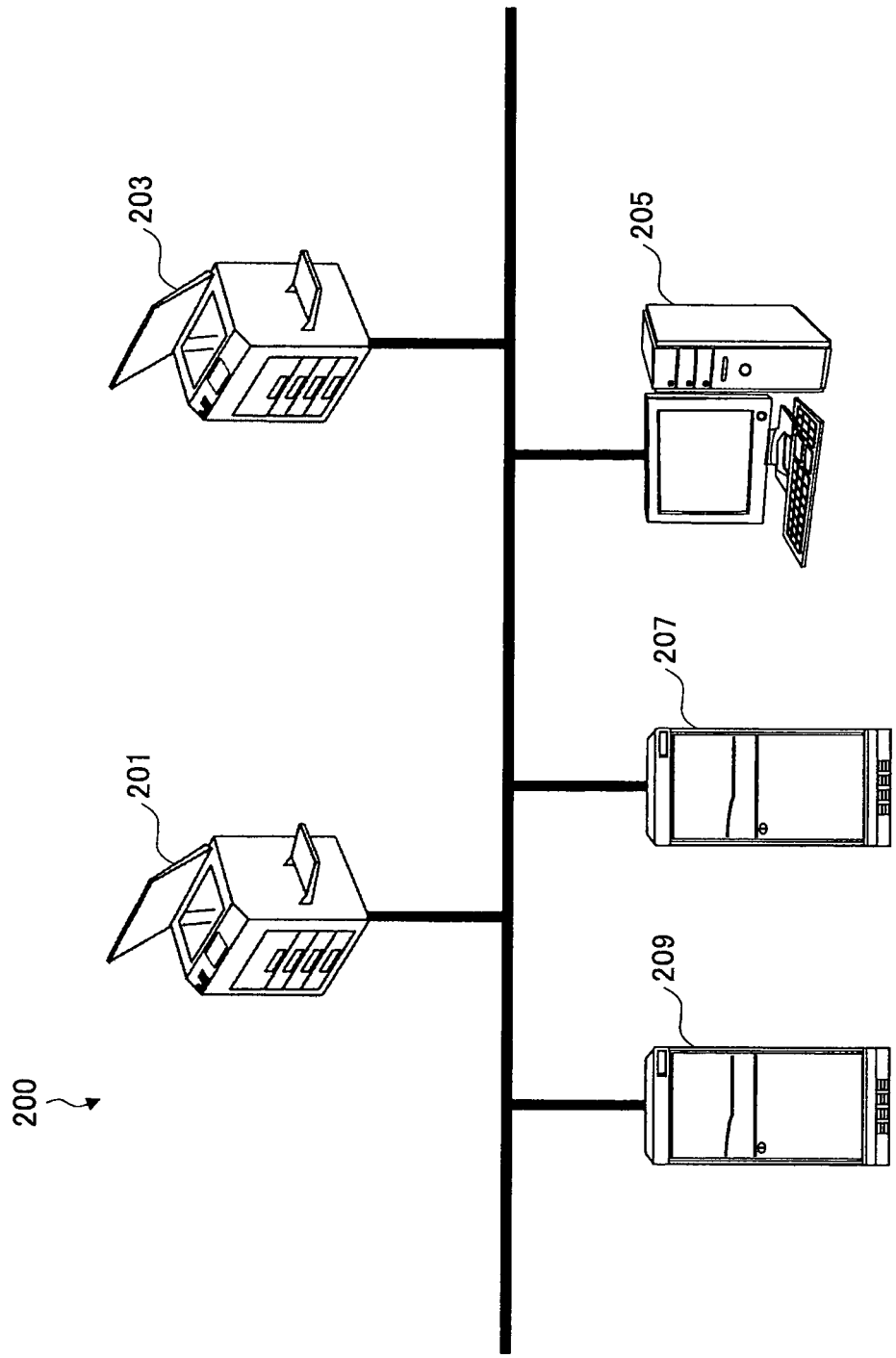
FIG. 2 illustrates an example of a process coordinating system according to an embodiment of the present invention.

FIG. 2 illustrates a process coordinating system 200 according to an embodiment of the present invention. As illustrated, the process coordinating system 200 includes a MFP 201, a MFP 203, an information processing apparatus 205, and document management servers 207 and 209, which are connected via a network.

In the process coordinating system 200 of FIG. 2, image data transmitted from the MFP 201 is acquired by the information processing apparatus 205. The acquired image data may be viewed or edited in the information processing apparatus 205 and then distributed to the document management server 207. The information processing apparatus 205 may transmit the edited image data by attaching it to a mail message, or by fax.

The apparatuses that may be connected to the process coordinating system 200 are not limited to those illustrated in FIG. 2. Preferably, at least one apparatus that outputs image data, one apparatus that edits the image data, and one apparatus as a distribution destination of the edited data may be connected to the network of the process coordinating system 200.

Figure 3:
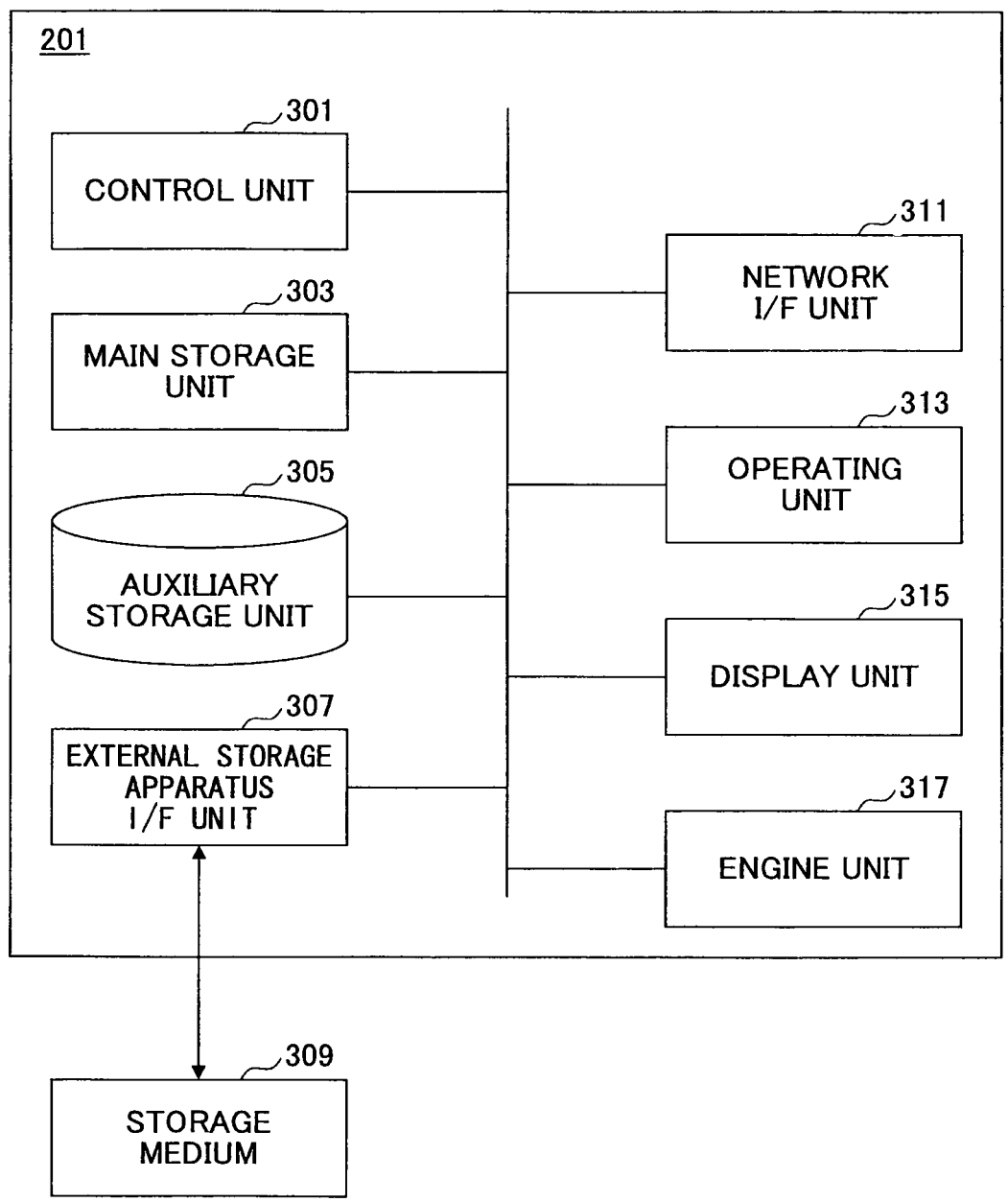
FIG. 3 is a hardware block diagram of an MFP according to the present embodiment.

A hardware structure of the MFP 201 is described with reference to FIG. 3 illustrating a block diagram of the hardware structure. As illustrated in FIG. 3, the MFP 201 includes a control unit 301, a main storage unit 303, an auxiliary storage unit 305, an external storage apparatus I/F unit 307, a network I/F unit 311, an operating unit 313, a display unit 315, and an engine unit 317. These units are connected to each other via a bus such that they can transmit and receive data between one another.

The control unit 301 may include a CPU for controlling various units or for operating or processing data in a computer. The control unit 301 may include a operating unit for executing a program stored in the main storage unit 303 or the auxiliary storage unit 305. For example, the control unit 301 receives data from an input unit or a storage unit, operates on or processes the data, and then outputs the operated on or processed data to an output unit or the storage unit.

The main storage unit 303 may include a ROM (Read Only Memory) or a RAM (Random Access Memory) for storing or temporarily saving an operating system (OS) which is basic software executed by the control unit 301, an application software program, or various data.

The auxiliary storage unit 305 may include a HDD (Hard Disk Drive) for storing data related to the application software or the like.

The external storage apparatus I/F unit 307 provides an interface between the MFP 201 and a storage medium 309 (such as a flash memory or an SD card) connected via a data transmission channel, such as a USB (Universal Serial Bus).

The storage medium 309 may store a predetermined program which may be installed in the MFP 201 via the external storage apparatus I/F unit 307 and then executed by the MFP 201.

The network I/F unit 311 provides an interface between the MFP 201 and a peripheral device having a communication function and connected via a network, such as a LAN (Local Area Network) or a WAN (Wide Area Network) formed by using a data transmission channel, such as a wired or wireless line.

The operating unit 313 or the display unit 315 may include a LCD (Liquid Crystal Display) having key switches (hardware keys) and a touch panel function including GUI (Graphical User Interface) software keys. The operating unit 313 and the display unit 315 thus provide a display and/or an input unit that provides a user interface (UI) for utilizing the functions of the MFP 201.

The engine unit 317 may include an image data input/output unit for reading a paper manuscript or printing data on a transfer sheet. The engine unit 317 may include a scanner engine.

Figure 4:
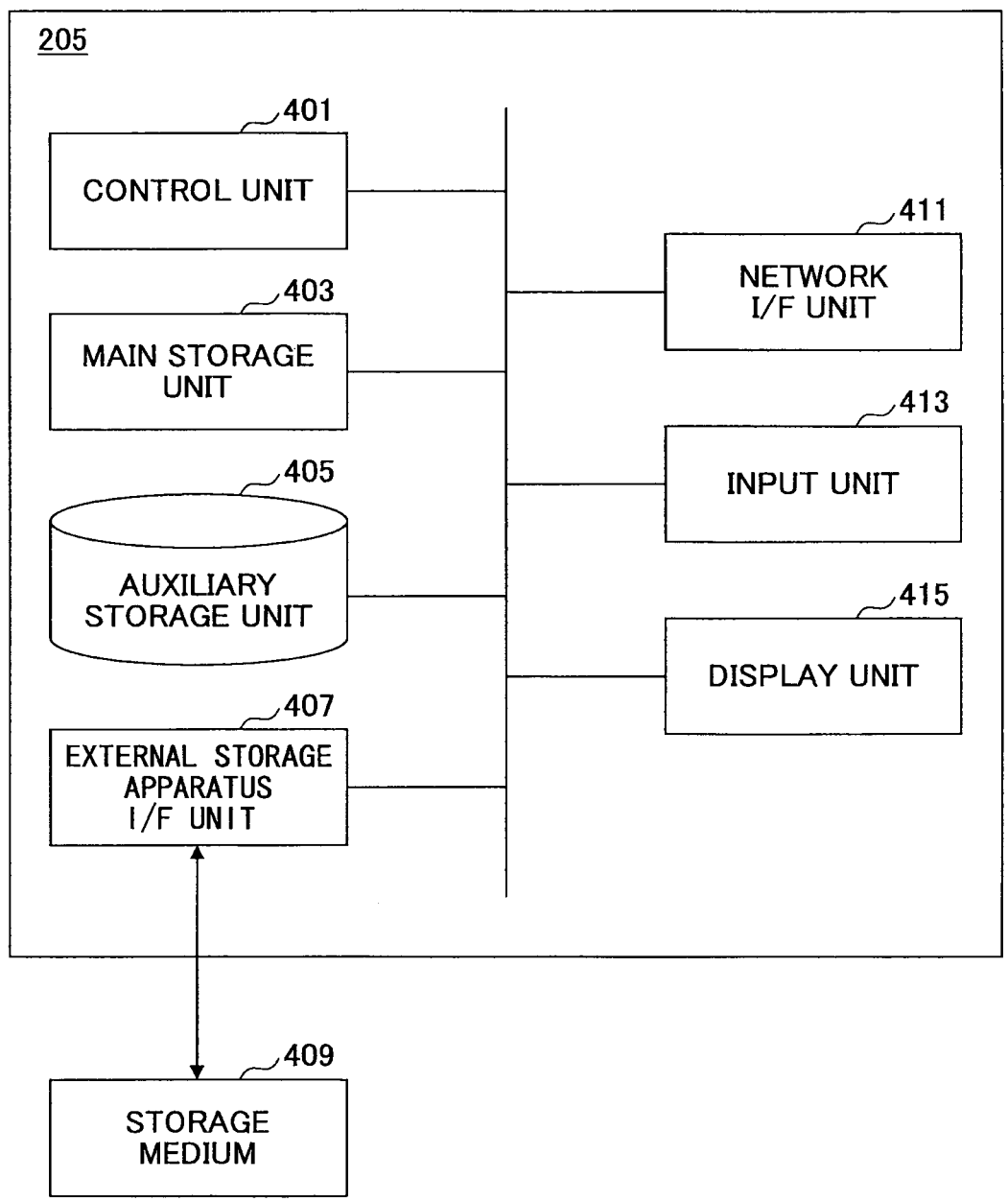
FIG. 4 is a block diagram of a hardware structure of an information processing apparatus according to the present embodiment.

A hardware structure of the information processing apparatus 205 is described below. FIG. 4 is a block diagram of the hardware structure of the information processing apparatus 205. As illustrated in FIG. 4, the information processing apparatus 205 includes a control unit 401, a main storage unit 403, an auxiliary storage unit 405, an external storage apparatus I/F unit 407, a network I/F unit 411, an input unit 413, and a display unit 415. These units are connected to each other via a bus such that they can transmit and receive data between one another.

The control unit 401 may include a CPU for controlling various units or operating on or processing data. The control unit 401 may also include an operating unit for executing a program stored in the main storage unit 403. For example, the control unit 401 receives data from an input unit or a storage unit, operates on or processes the data, and then outputs the operated on or processed data to an output unit or the storage unit.

The main storage unit 403 may include a ROM (Read Only Memory) or a RAM (Random Access Memory) for storing or temporarily saving an operating system (OS) which is a basic software program executed by the control unit 401, an application software program, or various data.

The auxiliary storage unit 405 may include a HDD (Hard Disk Drive) for storing data related to the application software program.

The external storage apparatus I/F unit 407 provides an interface between the information processing apparatus 205 and a storage medium 409 (such as a flash memory) connected via a data transmission channel, such as a USB (Universal Serial Bus).

The storage medium 409 may store a predetermined program which may be installed in the information processing apparatus 205 via the external storage apparatus I/F unit 407 and then executed by the information processing apparatus 205.

The network I/F unit 411 provides an interface between the information processing apparatus 205 and a peripheral device having a communication function and connected via a network, such as a LAN (Local Area Network) or a WAN (Wide Area Network) formed of a data transmission channel which may include a wired and/or a wireless line.

The input unit 413 may include a keyboard having a cursor key, number input keys, and various function keys, and a mouse or a slide pad for selecting a key and the like on a display screen of the display unit 415. The input unit 413 may thus provide a user interface for allowing a user to enter an operation instruction or input data into the control unit 401.

The display unit 415 may include a CRT or a LCD for displaying the display data inputted from the control unit 401.

Embodiment 1

The process coordinating system 200 according to Embodiment 1 is described. First, the functions of the apparatuses of the process coordinating system 200 are described.

<Functions>

Figure 5:
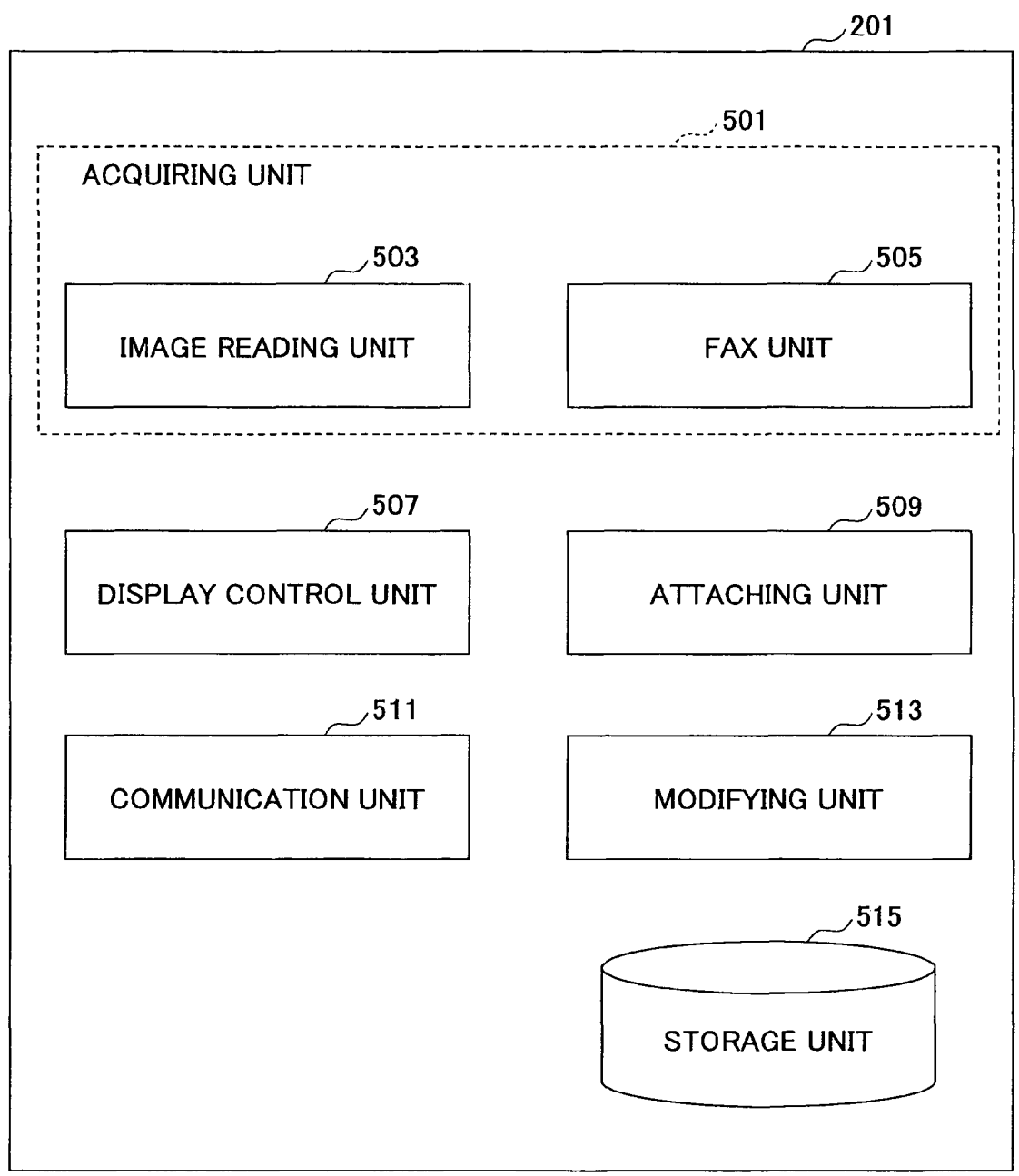
FIG. 5 is a functional block diagram of the MFP according to Embodiment 1 of the present invention.

FIG. 5 is a functional block diagram of the MFP 201. The MFP 201 of FIG. 5 includes an acquiring unit 501, a display control unit 507, an attaching unit 509, a communication unit 511, a modifying unit 513, and a storage unit 515. The acquiring unit 501 includes an image reading unit 503 and a fax unit 505.

The image reading unit 503 may be realized by a scanner engine in the engine unit 317. The fax unit 505 may be realized when a fax program is executed by the control unit 301. The display control unit 507, the attaching unit 509, and the modifying unit 513 may be realized when corresponding programs are executed by the control unit 301. The communication unit 511 may be realized by the network I/F unit 311. The storage unit 515 may be realized by the main storage unit 303 or the auxiliary storage unit 105.

The acquiring unit 501 includes an image reading unit 503 and a fax unit 505 for acquiring image data. The image reading unit 503 may include a scanner that generates or acquires image data by reading a document. The fax unit 505 acquires image data by receiving the image data via fax.

Figure 6:
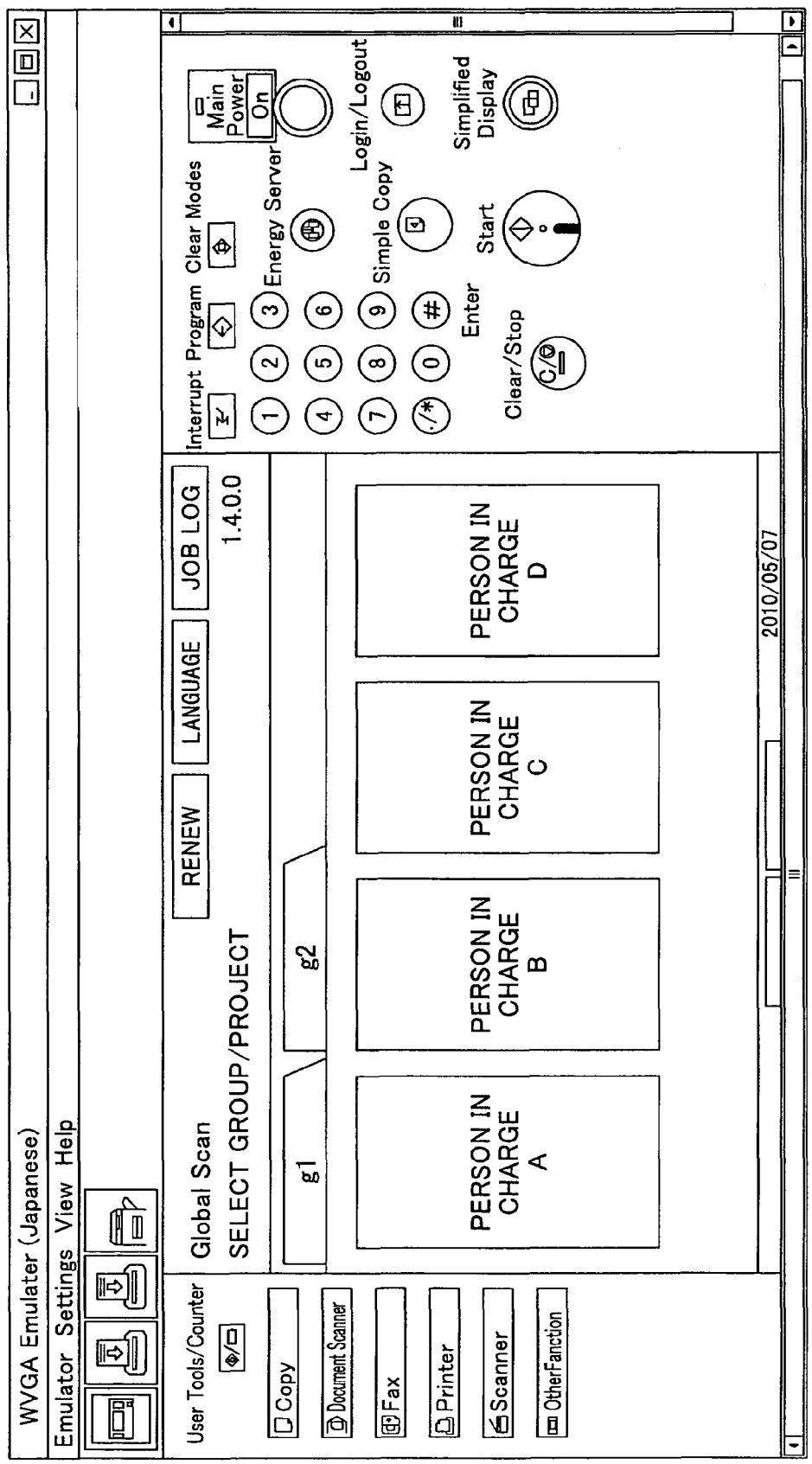
FIG. 6 illustrates an example of an operating screen.

The display control unit 507 exerts control in order to cause an operating screen to be displayed on an operations panel (the operating unit 313 and the display unit 315) of the MFP 201. FIG. 6 illustrates an example of the operating screen. The example illustrated in FIG. 6 is of an operating screen that is displayed after a scan distribution execution screen is activated. At the time of scanning, a user selects a person in charge of a transmission destination in the operating screen displayed on the operations panel. Each of the persons in charge displayed on the operating screen may be associated with a mail address of the person in charge, an IP address of a personal computer (PC) of the person in charge, and a URL path for a folder in the PC of the person in charge. In accordance with the present embodiment, the transmission destination is a folder in the PC of the person in charge.

Upon detection of the pressing of a start button after the person in charge is selected on the operating screen of FIG. 6, the display control unit 507 sends information indicating the selected person in charge to the attaching unit 509 and also instructs the scanner engine to execute a process. Thus, a document is scanned. Alternatively, the operating screen of FIG. 6 may be displayed after a scan is performed and image data has been acquired.

The attaching unit 509 may store metadata in association with each of the persons in charge of the transmission destination. The metadata may be stored in a separate storage unit 515 and the attaching unit 509 may read the metadata from the storage unit 515 as needed. The metadata may include process contents for the transmission destination and a document property of the image data. The process contents may include a process flow indicating a flow of processes to be performed on the image data. The process flow may define a seal-affixing process and a mail transmission process in order.

FIG. 7 illustrates an example of the metadata. In the example of FIG. 7, the metadata is described in XML format; however, the data format is not particularly limited as long as the metadata can be decoded by the information processing apparatus at the transmission destination. The data between "<metadata>" tag and a "</metadata>" tag indicates the metadata. A "<displayName>" tag 701 indicates a displayed name of the document. In the example of FIG. 7, the displayed name of the document is "sample". A "<fileName>" tag 702 indicates a file name of the document, which in the example of FIG. 7 is "sample.doc".

An "<editingFlow>" tag 703 indicates a process flow. Within this tag 703, the process contents are defined in order. The process contents may consist of a single process. In the example of FIG. 7, the process flow indicates that a stamp registered with an ID "AAA" is affixed onto a predetermined position of the image data, and then the image data is transmitted to "000-000-0000" via fax from the PC.

An "<item order="1" id="AAA">" tag 704 indicates a process of affixing the stamp with the ID "AAA" in the stamp process with a process order "1".

An "<item order="2" number="000-000-0000">" tag 705 indicates a process of transmitting the image data to the fax number "000-000-0000" in a "sendPCFAX" process with a process order "2".

The metadata may also include operational attributes of the image data. For example, when the image data concerns an order slip, the metadata may include a delivery date, a recipient of the order slip, the name of the department of the recipient, and/or the person in charge as document properties.

While the example of the process flow included in the metadata illustrated in FIG. 7 indicates the flow of two processes, the process flow may indicate three or more processes.

The metadata may be selected by the user on the operating screen before or after selection of the transmission destination. In this case, plural stored items of metadata may be displayed on the operating screen. The metadata may be displayed in a language format as illustrated in FIG. 7. Alternatively, UI components corresponding to the metadata may be displayed for improved visual recognition.

Thus, by including the process contents for the distributed system in the metadata, it becomes possible to define the process contents for the distributed system on the distributing system end.

The attaching unit 509 attaches the metadata selected by the user or in response to the selection of the transmission destination to the image data acquired by the acquiring unit 501.

The communication unit 511 may transmit or receive data. For example, the communication unit 511 transmits image data and metadata to the transmission destination selected on the operating screen illustrated in FIG. 6.

The modifying unit 513 modifies the process contents of the metadata depending on various conditions. For example, the modifying unit 513 may modify the stamp during the stamp process based on the information of a transmission source from which data has been received via fax by the fax unit 505. The stamp may be modified by changing the ID included in the metadata. The modifying unit 513 may modify the transmission destination of the PC fax transmit process based on the time of acquisition of the image data by the acquiring unit 501.

Preferably, the modifying unit 513 may add or delete a process in the process flow. For example, the modifying unit 513 may change the PC fax transmit process of the process flow to a mail transmission process if the time of acquisition of the image data by the acquiring unit 501 is late at night.

Thus, appropriate process contents can be included in the metadata based on the image data acquisition conditions.

The storage unit 515 may store operating screen data or a URL indicating the location of a folder at the transmission destination in association with the corresponding person in charge. Preferably, the storage unit 515 may store the metadata in association with the corresponding person in charge.

Figure 8:
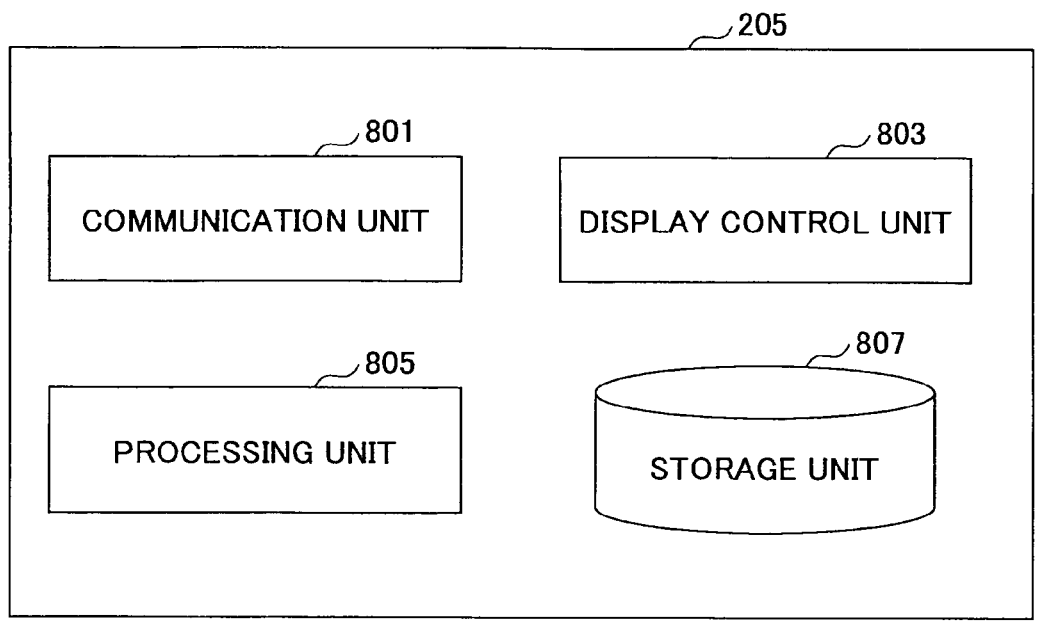
FIG. 8 is a functional block diagram of the information processing apparatus according to Embodiment 1.

The functions of the information processing apparatus 205 are described. FIG. 8 is a functional block diagram of the information processing apparatus 205 according to Embodiment 1. As illustrated, the information processing apparatus 205 includes a communication unit 801, a display control unit 803, a processing unit 805, and a storage unit 807.

The communication unit 801 may be realized by the network I/F unit 411. The display control unit 803 and the processing unit 805 may be realized when one or more programs are executed by the control unit 401. The storage unit 807 may be realized by the main storage unit 403 or the auxiliary storage unit 405.

The functions of the information processing apparatus 205, which will be described later, may be provided by executing a document processing program for realizing the functions of the communication unit 801, the display control unit 803, and the processing unit 805 of the information processing apparatus 205.

The communication unit 801 may transmit or receive data. For example, the communication unit 801 receives image data and metadata from the MFP 201. The communication unit 801 outputs the received image data and metadata to the display control unit 803 and the processing unit 805.

The display control unit 803 controls the display of a screen for displaying the acquired image data and metadata on the display unit 415. Specifically, the display control unit 803 causes the image data and an execution button for a process included in the metadata to be displayed in the same screen.

Thus, the user can press the process execution button while confirming the image data. Further, the user can press the execution button upon confirming the image data without being particularly aware of the contents of the process.

Upon detection of the pressing of the execution button, the display control unit 803 instructs the processing unit 805 to execute a process. The processing unit 805 executes the process indicated in the process contents included in the metadata. Upon acquisition of the metadata illustrated in FIG. 7, the processing unit 805 affixes the stamp registered with the ID "AAA" onto a predetermined position in the acquired image data. Then, the processing unit 805 executes the "FAX" program in order to transmit the image data with the affixed stamp to the number set in the metadata by fax via the communication unit 801.

Preferably, the processing unit 805 may perform an image editing process which may include, writing a letter or a character or inserting a figure in the image data. The storage unit 807 may store various processing programs executed by the processing unit 807.

Figure 9:
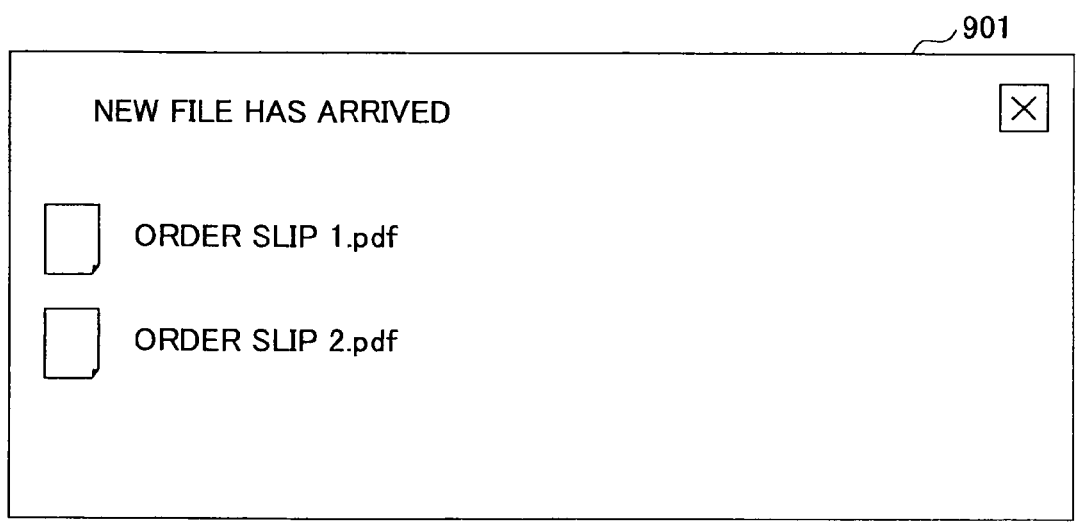
FIG. 9 illustrates an example of a notification screen.

FIG. 9 illustrates an example of a notification screen. Display of the screen of FIG. 9 is controlled by the display control unit 803. The notification screen of FIG. 9 may be displayed on the display unit 415 upon acquisition of the image data and the metadata by the communication unit 801 and their storage in a predetermined folder or upon mail reception in order to let the user know about the arrival of a file. The file may include image data. In the example of FIG. 9, an "order slip 1.pdf" and an "order slip 2.pdf" have been received from the MFP 201.

The display control unit 803 monitors a predetermined folder and, when a file is newly stored in the predetermined folder, acquires its file name, and then reports via the notification screen 902, for example. Preferably, the monitoring process may be performed by a process unit separately from that of the display control unit 803. The predetermined folder is set in advance as a folder for storing data distributed from the MFP 201. The notification screen 901 may be configured to pop up due to a setting.

Figure 10:
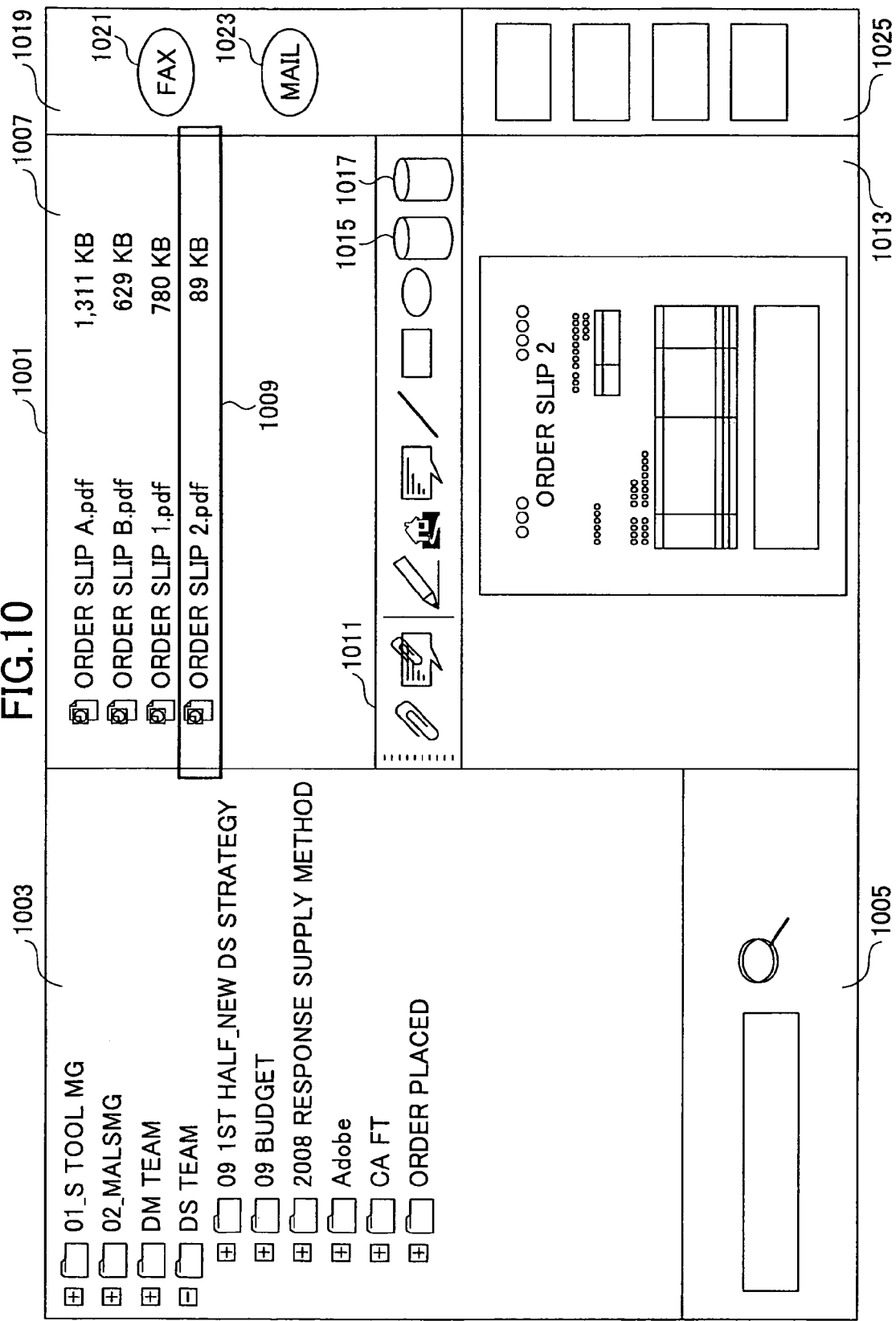
FIG. 10 illustrates an example of a screen of predetermined folders.

FIG. 10 illustrates an example of a screen 1001 of predetermined folders. The screen 1001 illustrated in FIG. 10 may be displayed when the document processing program according to the present embodiment is executed. The document processing program according to the present embodiment may be executed by the information processing apparatus 205 a computer to provide the function of the display control unit 803, the function of requesting the processing unit 805 to execute a process, or the function of requesting the communication unit 801 for distribution.

The screen 1001 includes an explorer area 1003, a search window area 1005, a document list area 1007, a tool bar area 1011, a preview area 1013, an output/transmission setting area 1019, and a document property area 1025. The display of the screen of FIG. 10 is controlled by the display control unit 803.

The explorer area 1003 displays the hierarchy of the folders managed by the information processing apparatus 205. The search window area 1005 displays an input field for search. The document list area 1007 displays a list of documents in the folder selected in the explorer area 1003. The user can select a predetermined document from the document list. In the example of FIG. 10, the "order slip 2.pdf" is selected.

In the tool bar area 1011, edit execution buttons for the image data in the preview area 1013 are displayed. In the preview area 1013, a preview of the documents in the document list area 1007 is displayed. In the tool bar area 1011, the edit execution buttons may include execution buttons for processes other than the distribution process in the process contents included in the metadata acquired by the information processing apparatus 205 from the MFP 201. The seal button 1015 may include an execution button for affixing an approval stamp at a predetermined position. The seal button 1017 may include an execution button for affixing an approval requesting stamp at a predetermined position.

The output/transmission setting area 1019 displays execution buttons for distributing the image data being displayed in the preview area 1013. These execution buttons are the execution buttons for the process corresponding to the distribution process in the process contents included in the metadata acquired by the information processing apparatus 205 from the MFP 201. The execution buttons include a fax execution button 1021 and a mail transmission execution button 1023.

The document property area 1025 displays document properties of the previewed image data. The document property list 1025 may display setting values included in the metadata acquired by the information processing apparatus 205 from the MFP 201. For example, the displayed document properties include a file name, a creator, a date of creation, a delivery date, and a destination.

When any of the process execution buttons included in the tool bar area 1011 corresponds to a process that is executed prior to distribution without fail, the corresponding process may be executed upon pressing of the corresponding execution button in the output/transmission setting area 1019 without displaying the process execution button in the tool bar area 1011.

For example, when the image data is transmitted by fax without fail after an approval stamp is affixed to the image data, the approval stamp may be affixed at a predetermined position of the image data when the fax button 1019 is pressed, without displaying the seal button 1015. The type of the approval stamp or the fax address may be included in the metadata acquired from the MFP 201.

In the example of FIG. 10, the metadata acquired from the MFP 5 includes two process flows. One is a process flow for distribution to a server after affixing the approval stamp. The other is a process flow for mailing to a supervisor after affixing an approval requesting stamp. Thus, the metadata may include plural process flows.

Thus, the person in charge of operation of the information processing apparatus 1 may simply press the corresponding distribution execution button after confirming the image data in the preview area 1013, without having to select which position to affix which stamp, or select or input a distribution address. Further, when a process flow is associated with one execution button, all of the process contents defined in the process flow can be processed by a single pushing of the button, thus eliminating the need for the person in charge to perform a complicated operation.

The process coordinating system 200 according to the present embodiment, with the functions described above, can perform the following operations. For example, a person in charge of receiving orders scans an order slip received by mail using the MFP 201. The person in charge then transmits the scanned image data to the PC of a person in charge of placing orders by using the distribution function of the MFP 201. The person in charge of placing orders may then perform a necessary editing process on the received image data by using a software program (such as the document processing program), and then place an order for a product or make an examination request.

A case is considered in which the person in charge of receiving orders is well-versed in the above operation while the person in charge of placing orders is not well-versed in the operation. In this case, even when the person in charge of placing orders is not knowledgeable about the process contents, the person in charge of placing orders can simply press an execution button without being particularly aware of the process contents because the process contents are set in the metadata by the person in charge of receiving orders.

Specifically, first the person in charge of receiving orders scans the order slip on the MFP 201. Upon detection of the pressing of the scan distribution execution button, the MFP 201 causes the display of the screen as illustrated in FIG. 6. Then, the person in charge of receiving orders selects the person in charge of placing orders at the transmission destination by using the screen of FIG. 6. The person in charge of receiving orders then presses an execution button.

Upon detection of the pressing of the scan execution button, the MFP 201 scans the document and generates image data. The MFP 201 distributes the generated image data to a folder in the PC of the person in charge of placing orders, together with the metadata associated with the selected person in charge of placing orders.

Then, the information processing apparatus 205 acquires the image data of the order slip and the metadata from the MFP 201. When the image data is stored in a predetermined folder, the information processing apparatus 205 may cause a pop-up of a notification screen (see FIG. 9) to notify the person in charge of placing orders.

The person in charge of placing orders then activates the document processing program according to the present embodiment, and selects a file (image data) from a predetermined screen (see FIG. 10). The information processing apparatus 205 causes the execution buttons for the processes in the process contents included in the metadata and the selected file to be displayed in the same screen. The execution buttons may include a seal button, a fax transmit button, a mail transmission button, and/or a FTP transmit button. The person in charge of placing orders confirms the file on the screen and then presses the appropriate execution button.

For example, the person in charge of placing orders changes the execution button to be pressed depending on the amount of the product for which an order is placed, as follows.
(When the amount is less than 10,000 yen)

The person in charge of placing orders presses an approval seal button. The information processing apparatus 205 then affixes an approval seal at a predetermined position on the image data of the order slip. Then, the person in charge of placing orders presses the FTP transmit button. The information processing apparatus 205 transmits the image data with the approval seal to a file server for managing seal-affixed order slips. A user name and a password for accessing the file server may be included in the metadata.

Preferably, as mentioned above, by associating the stamp affixing process with the FTP transmit process into a series of processes, the person in charge of placing orders may simply press the FTP transmit button and then the information processing apparatus 205 can automatically execute the affixing process and the FTP transmit process.
(When the amount is 10,000 yen or more)

The person in charge of placing orders presses an approval-request seal button. The information processing apparatus 205 affixes an approval-request seal at a predetermined position on the image data of the order slip. Then, the person in charge of placing orders presses the mail transmission button. The information processing apparatus 205 then attaches the stamp-affixed image data to a mail message and transmits the mail message to the PC of his or her supervisor. The supervisor's mail address may be included in the metadata.

Preferably, as mentioned above, by associating the stamp affixing process with the mail transmission process into a series of processes, the person in charge of placing orders may simply press the mail transmission button and then the information processing apparatus 205 can automatically execute the seal-affixing process and the mail transmission process.

<Operation>

Figure 11:
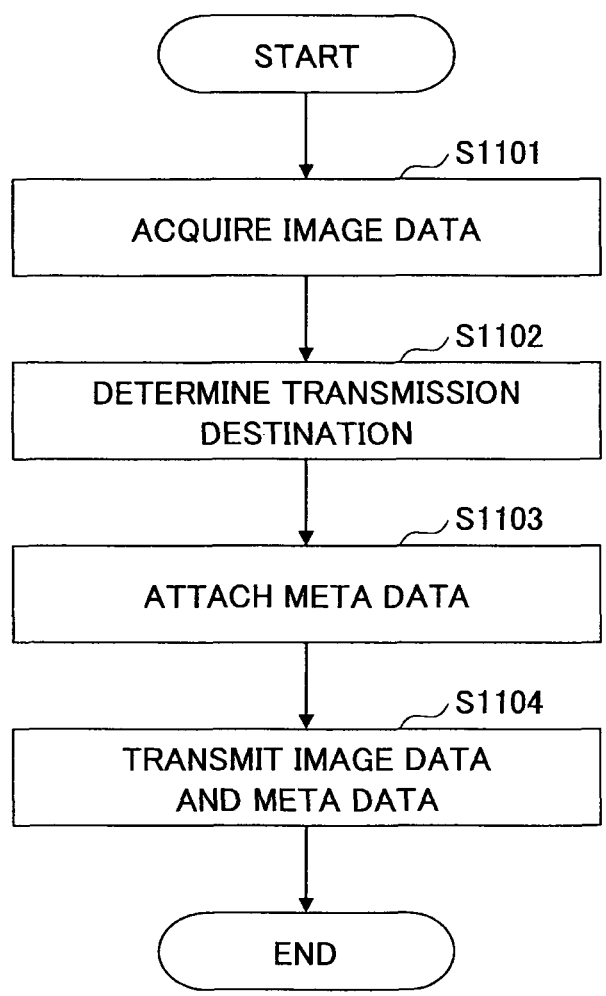
FIG. 11 is a flowchart of a process in a MFP.

Operations of the apparatuses in the process coordinating system according to Embodiment 1 are described. FIG. 11 is a flowchart of an MFP process. In step S1101, the acquiring unit 501 acquires image data by scanning or via fax.

In step S1102, a user selects a transmission destination displayed on the operations panel. For example, the display control unit 507 controls the display on the operating screen such that one of the persons in charge can be selected as the transmission destination. Preferably, steps S1101 and S1102 may be performed in the opposite order.

In step S1103, the attaching unit 509 attaches the metadata corresponding to the person in charge of the transmission destination to the scanned image data. The metadata defines the process contents to be processed at the transmission destination.

In step S1104, when the distribution execution button is pressed, the communication unit 511 transmits the image data and the metadata to the transmission destination determined in step S1102.

Figure 12:
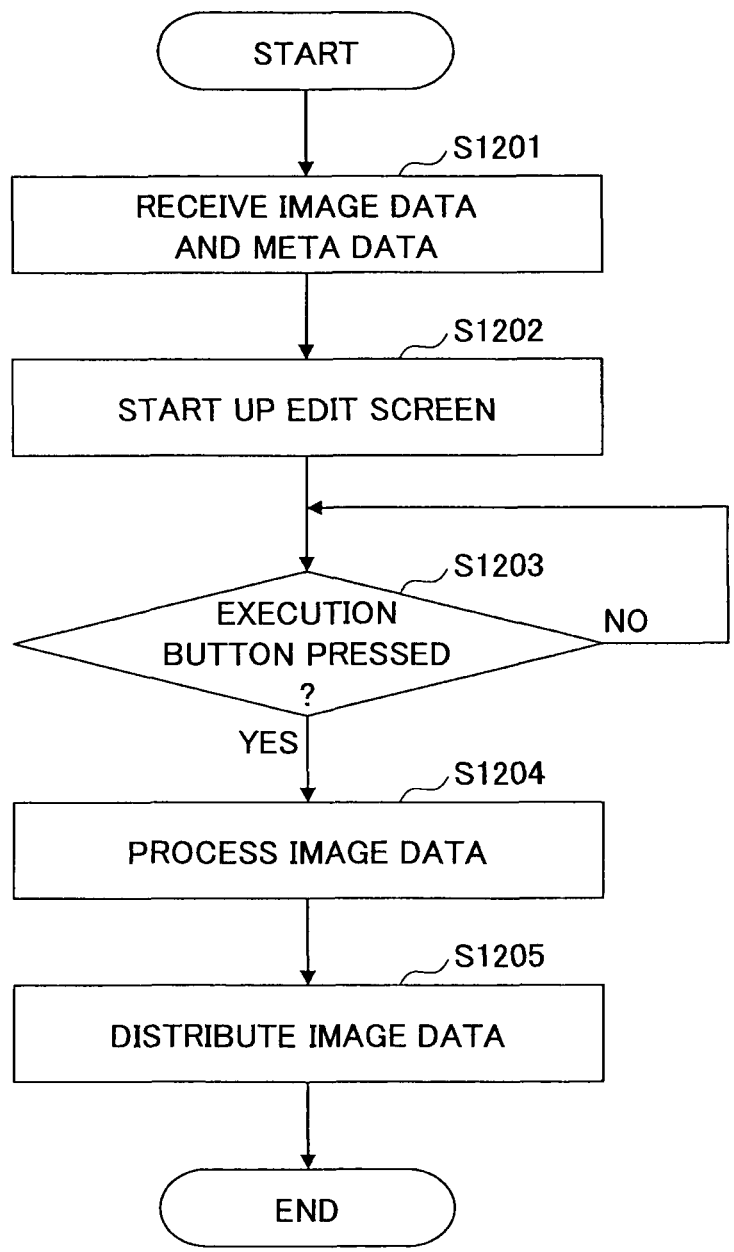
FIG. 12 is a flowchart of a process in an information processing apparatus.

FIG. 12 is a flowchart of an example of a process performed by an information processing apparatus. In the process of FIG. 12, a process flow is associated with the distribution process execution button.

In step S1201, the communication unit 801 receives image data and metadata from the MFP 201.

In step S1202, when the user selects the activation of a screen as illustrated in FIG. 10, the display control unit 803 activates the screen. The screen displays the received image data and the execution buttons for the process contents included in the received metadata in the same screen.

In step S1203, the display control unit 803 determines whether an execution button has been pressed by they user. If it is determined in step S1203 that the execution button is pressed ("YES"), the routine advances to step S1204. If not ("NO"), the routine returns to step S1203.

In step S1204, the processing unit 805 executes the processes of the process contents included in the metadata. For example, the processing unit 805 affixes a stamp at a predetermined position of the image data.

In step S1205, the communication unit 801 distributes the image data processed in step S1204 to the distribution destination set in the metadata. For example, the image data is distributed by fax transmission, FTP transmission, or mail transmission.

Thus, according to Embodiment 1, the coordination between the system that distributes data and the system that processes the distributed data can be improved. Further, a series of operations that utilize both of the systems can be set at the time of distribution, so that the operations can be performed efficiently. Because the person in charge of the information processing apparatus to which the image data is distributed only needs to press an execution button after confirming the image data, the person in charge need not set the contents of a process performed in the information processing apparatus by himself.

Embodiment 2

The process coordinating system according to Embodiment 2 is described. In accordance with Embodiment 2, metadata is acquired by reading a bar code and the like. The hardware of the apparatuses in the process coordinating system according to Embodiment 2 may be similar to that of Embodiment 1 with the exception that the MFP 201 includes a reading unit for reading a bar code or a QR code, for example.

<Function>

Figure 13:
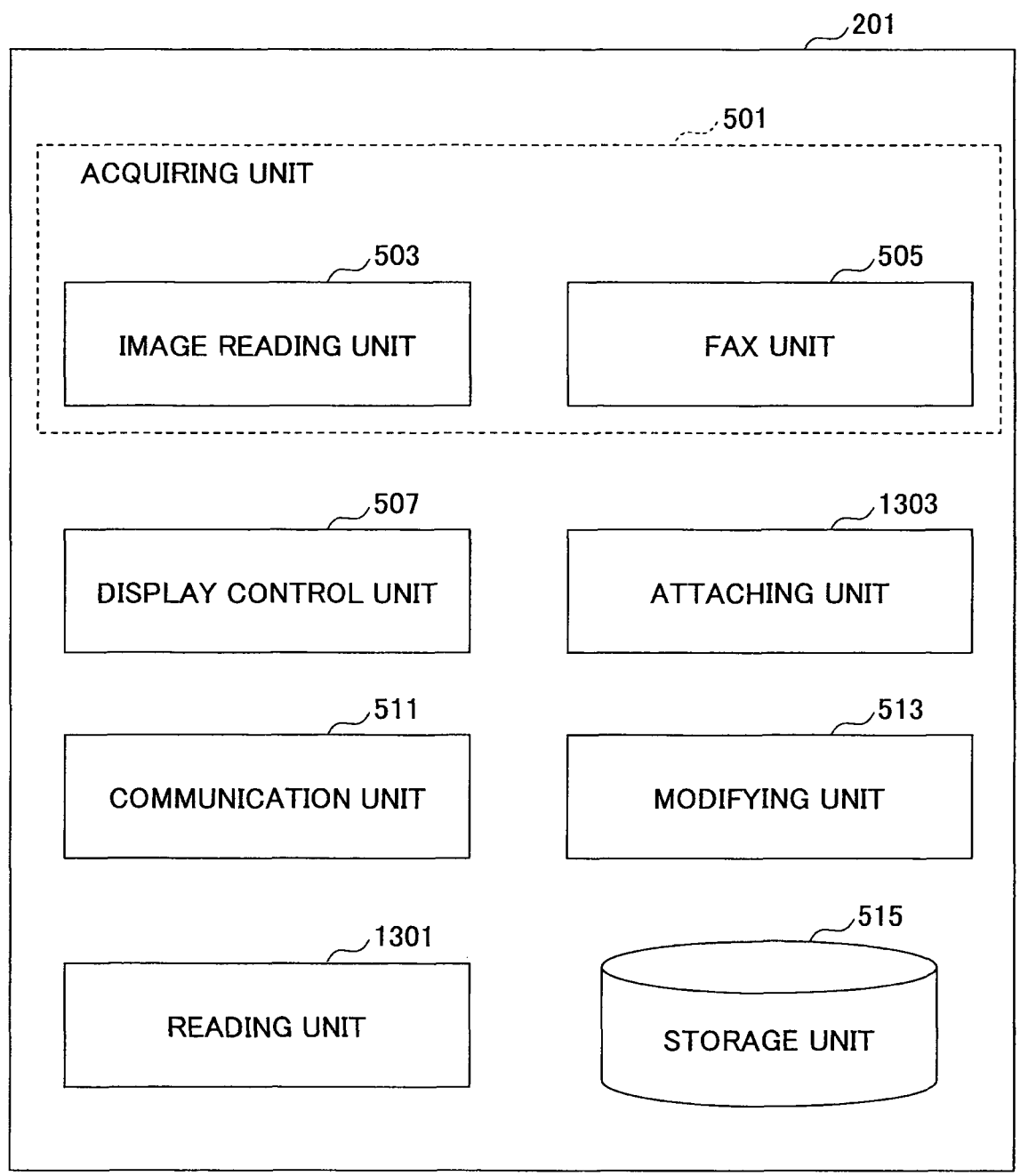
FIG. 13 is a functional block diagram of an MFP according to Embodiment 2.

FIG. 13 is a block diagram illustrating the functions of the MFP 201 according to Embodiment 2. The functions of the MFP 201 according to Embodiment 2 similar to those of Embodiment 1 are designated with similar numerals and their description is omitted. As illustrated in FIG. 13, the MFP 201 includes a reading unit 1301 and an attaching unit 1303. The reading unit 1301 may be realized by a bar code reader or a QR code reader.

The reading unit 1301 reads a bar code or a QR code provided at a predetermined position of a document that is scanned. Preferably, the bar code or the QR code may be provided in a document other than a document that is to be distributed. In this case, the document that is to be distributed and the document in which the bar code or the QR code is provided may be associated with each other by scanning the latter after the document that is to be distributed.

The reading unit 1301 acquires metadata by reading the bar code or the QR code. In accordance with the present embodiment, the metadata described in Embodiment 1 is embedded in the bar code or the QR code. The reading unit 1301 then outputs the metadata to the attaching unit 1303.

The attaching unit 1303 attaches the metadata acquired from the reading unit 1301 to image data acquired by the acquiring unit 501. The attaching unit 1303 then outputs the image data and the metadata to the communication unit 511. Upon reception of a distribution instruction from a user, the communication unit 511 transmits the image data and the metadata to the transmission destination.

Thus, the metadata can be read by the MFP in the form of a bar code and the like, so that the process contents contained in the metadata can be flexibly set. The functions of the information processing apparatus 205 may be similar to those of Embodiment 1.

<Operation>

Figure 14:
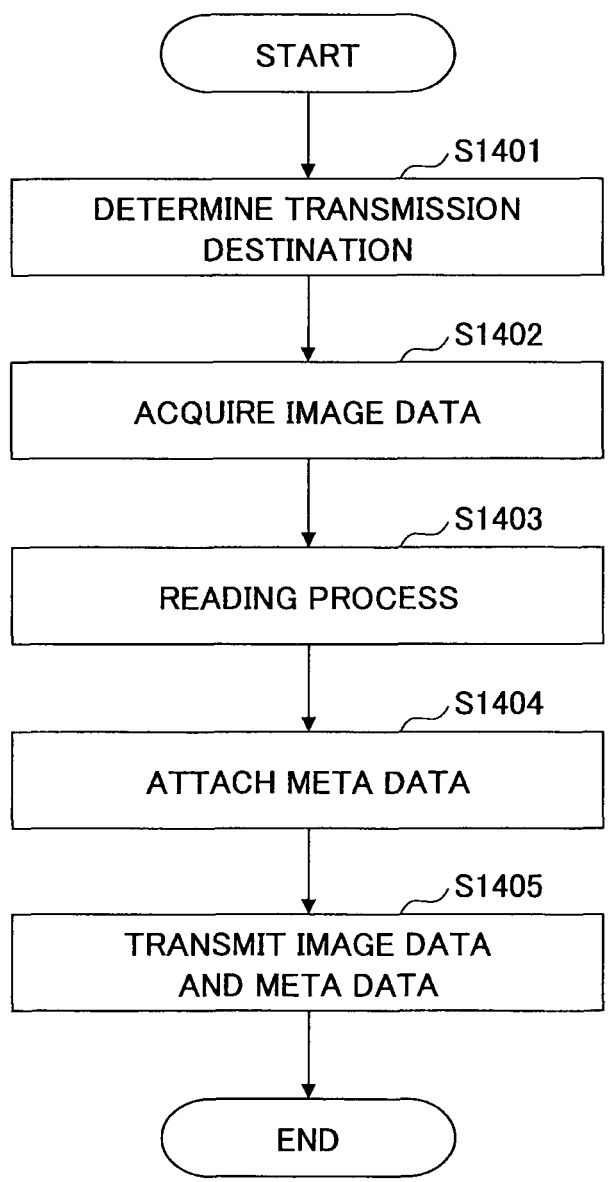
FIG. 14 is a flowchart of a process in the MFP according to Embodiment 2.

An operation of the MFP 201 according to Embodiment 2 is described. FIG. 14 is a flowchart of a process of the MFP according to Embodiment 2. In step S1401, a user selects a transmission destination displayed on the operations panel. For example, the display control unit 507 controls the display of the operating screen such that one of the persons in charge can be selected as the transmission destination (see FIG. 6).

In step S1402, the acquiring unit 501 acquires image data by scanning or via fax reception. For example, the acquiring unit 501 acquires the image data by scanning a document to which a bar code or a QR code is attached. The acquiring unit 501 then outputs the image data with the attached bar code or the QR code to the reading unit 1301, and outputs other image data to the attaching unit 1303.

In step S1403, the reading unit 1301 performs a bar code or a QR code reading process on a predetermined position of the image data acquired from the acquiring unit 501. The reading unit 1301 then outputs the metadata that has been read to the attaching unit 1303.

In step S1404, the attaching unit 1303 attaches the metadata read by the reading unit 1301 to the scanned image data. The metadata defines the process contents that are to be processed at the transmission destination.

In step S1405, in response to the pressing of the distribution execution button, the communication unit 511 transmits the image data and the metadata to the transmission destination determined in step S1401.

Thus, in accordance with Embodiment 2, the metadata can be read by the MFP in the form of a bar code and the like, so that the process contents contained in the metadata can be flexibly set.

Variation

A program executed by an information processing apparatus according to Embodiment 1 or 2 may be recorded in a computer-readable recording medium, such as a CD-ROM, a flexible disc (FD), a CD-R, or a DVD (Digital Versatile Disk), in an installable or executable file format, and such computer-readable recording medium may be provided.

A program executed by the information processing apparatus according to Embodiment 1 or 2 may also be stored in a computer connected to a network, such as the Internet, downloaded via the network, and then provided. The program may include a document processing program. A program executed by the information processing apparatus according to Embodiment 1 or 2 may be provided or distributed via a network such as the Internet.

A program executed by the information processing apparatus according to Embodiment 1 or 2 may be installed inside a ROM which may be provided.

A program executed by the information processing apparatus 205 according to Embodiment 1 or 2 may have a modular structure including the various units described above. In this case, in terms of actual hardware, the CPU (processor) may read the program from the auxiliary storage unit 405 and execute the program, whereby one or more of the units may be generated and loaded in the main storage unit 403.

Although this invention has been described in detail with reference to certain embodiments, variations and modifications exist within the scope and spirit of the invention as described and defined in the following claims. For example, one or more of the constituent elements of any of the foregoing embodiments may be deleted. Alternatively, some of the constituent elements of one embodiment may be combined with some of the constituent elements of another embodiment.

The present application is based on Japanese Priority Application No. 2010-133568 filed Jun. 11, 2010, the entire contents of which are hereby incorporated by reference.

What is claimed is:

1. A process coordinating system in which an image forming apparatus and an information processing apparatus are connected via a network, the system comprising:
 the image forming apparatus including
  an acquiring unit configured to acquire image data;
  an attaching unit configured to attach metadata including process contents to the image data acquired by the acquiring unit; and
  a transmit unit configured to transmit the acquired image data and the attached metadata;
 the information processing apparatus including
  a receive unit configured to receive the image data and the metadata;
  a display control unit configured to cause an execution button for executing the process contents included in the received metadata and the received image data to be displayed in the same screen; and
  a processing unit configured to perform a process indicated by the process contents on the image data upon pressing of the execution button.

2. The process coordinating system according to claim 1, wherein the process contents include a process flow combining plural processes.

3. The process coordinating system according to claim 2, wherein the information processing apparatus is connected to a document managing apparatus via the network,
 the process flow includes an image data editing process and a distribution process for distributing the image data to the document managing apparatus, and
 the processing unit is configured to edit the image data and distribute the edited image data to the document managing apparatus.

4. The process coordinating system according to claim 1, wherein the image forming apparatus includes a modifying unit configured to modify the process contents depending on a condition of acquisition of the image data by the acquiring unit.

5. An information processing apparatus comprising:
 a receive unit configured to receive image data and metadata including process contents for the image data;
 a display control unit configured to cause an execution button for executing the process contents included in the received metadata and the received image data to be displayed in the same screen; and
 a processing unit configured to perform a process indicated by the process contents on the image data upon pressing of the execution button.

6. A non-transitory computer-readable recording medium storing an information processing program configured to cause a computer to provide the functions of:
 a receive unit configured to receive image data and metadata including process contents for the image data;
 a display control unit configured to cause an execution button for executing the process contents included in the received metadata and the received image data to be displayed in the same screen; and
 a processing unit configured to perform a process indicated by the process contents on the image data upon pressing of the execution button.

7. The process coordinating system of claim 1, wherein,
 the metadata corresponds to a transmission destination, the transmission destination being a recipient of the image data and the metadata, and
 the metadata includes process contents configured to be processed at the transmission destination.

8. The process coordinating system of claim 1, wherein,
 the metadata corresponds to a transmission destination, the transmission destination being a recipient of the image data and the metadata, and
 the metadata includes process contents configured to be processed at the transmission destination.

9. The process coordinating system of claim 1, wherein,
 the metadata corresponds to a transmission destination, the transmission destination being a recipient of the image data and the metadata, and
 the metadata includes process contents configured to be processed at the transmission destination.

* * * * *